(12) United States Patent
Wycech (10) Patent No.: US 7,713,372 B2
(45) Date of Patent: May 11, 2010

(54) METHOD FOR FORMING A TANGIBLE ITEM AND A TANGIBLE ITEM WHICH IS MADE BY A METHOD WHICH ALLOWS THE CREATED TANGIBLE ITEM TO EFFICIENTLY ABSORB ENERGY

(76) Inventor: Joseph S. Wycech, P.O. Box 172, St. Clair Shores, MI (US) 48080

( * ) Notice: Subject to any disclaimer, the term of this patent is extended or adjusted under 35 U.S.C. 154(b) by 0 days.

(21) Appl. No.: 12/584,922

(22) Filed: Sep. 15, 2009

(65) Prior Publication Data

US 2010/0007046 A1    Jan. 14, 2010

Related U.S. Application Data (63) Continuation of application No. 11/170,863, filed on Jun. 30, 2005, now abandoned.

(51) Int. Cl.
  B32B 37/00    (2006.01)
  B32B 27/00    (2006.01)
  C09J 5/02     (2006.01)
  D04H 1/20     (2006.01)

(52) U.S. Cl. .................... 156/276; 156/242; 156/307.3; 264/112

(58) Field of Classification Search .................. 428/34; 156/242, 245, 246, 293, 279, 297, 276, 291, 156/307.3, 307.4; 264/112; 427/197
See application file for complete search history.

(56) References Cited

U.S. PATENT DOCUMENTS

| | | | |
|---|---|---|---|
| 3,211,253 A | 10/1965 | Gonzalez | |
| 3,304,219 A * | 2/1967 | Nickerson | 428/327 |
| 4,079,162 A * | 3/1978 | Metzger | 523/219 |
| 4,107,426 A * | 8/1978 | Gordon | 536/56 |
| 4,250,136 A * | 2/1981 | Rex | 264/257 |
| 4,559,984 A | 12/1985 | Wycech | |
| 4,610,836 A | 9/1986 | Wycech | |
| 4,695,343 A | 9/1987 | Wycech | |
| 4,732,806 A * | 3/1988 | Wycech | 442/75 |
| 4,737,407 A | 4/1988 | Wycech | |
| 4,751,249 A | 6/1988 | Wycech | |
| 4,769,391 A | 9/1988 | Wycech | |
| 4,836,516 A | 6/1989 | Wycech | |
| 4,853,270 A | 8/1989 | Wycech | |
| 4,861,097 A | 8/1989 | Wycech | |
| 4,901,500 A | 2/1990 | Wycech | |
| 4,908,930 A | 3/1990 | Wycech | |
| 4,922,596 A | 5/1990 | Wycech | |
| 4,923,902 A | 5/1990 | Wycech | |
| 4,964,514 A | 10/1990 | Wycech | |
| 4,978,562 A | 12/1990 | Wycech | |
| 4,995,545 A | 2/1991 | Wycech | |

(Continued)

*Primary Examiner*—Rena L Dye
*Assistant Examiner*—James Yager
(74) *Attorney, Agent, or Firm*—John G. Chupa (57) ABSTRACT

A method for creating a tangible item (such as an "A" pillar garnishment 18) which increases the capacity of the item to absorb energy by the incorporation and/or addition of a plurality of adhesive-covered beads 25, and which utilizes the method and/or type of energy used to normally form the item to incorporate and/or add the adhesive-covered beads 25, thereby increasing efficiency while reducing cost. A new and novel tangible item, such as "A" pillar garnishment 18, having programmed energy absorption characteristics is also disclosed.

4 Claims, 5 Drawing Sheets

U.S. PATENT DOCUMENTS

| | | |
|---|---|---|
| 5,124,186 A | 6/1992 | Wycech |
| 5,308,663 A * | 5/1994 | Nakagawa et al. ......... 428/34.2 |
| 5,575,526 A | 11/1996 | Wycech |
| 5,755,486 A | 5/1998 | Wycech |
| 5,884,960 A | 3/1999 | Wycech |
| 5,887,470 A | 3/1999 | Mirtsch |
| 5,888,600 A | 3/1999 | Wycech |
| 5,992,923 A | 11/1999 | Wycech |
| 6,003,274 A | 12/1999 | Wycech |
| 6,058,673 A | 5/2000 | Wycech |
| 6,068,424 A | 5/2000 | Wycech |
| 6,079,180 A | 6/2000 | Wycech |
| 6,092,864 A | 7/2000 | Wycech |
| 6,096,403 A | 8/2000 | Wycech |
| 6,149,227 A | 11/2000 | Wycech |
| 6,165,588 A | 12/2000 | Wycech |
| 6,168,226 B1 | 1/2001 | Wycech |
| 6,189,953 B1 | 2/2001 | Wycech |
| 6,233,826 B1 | 5/2001 | Wycech |
| 6,237,304 B1 | 5/2001 | Wycech |
| 6,270,600 B1 | 8/2001 | Wycech |
| 6,272,809 B1 | 8/2001 | Wycech |
| 6,276,105 B1 | 8/2001 | Wycech |
| 6,287,666 B1 | 9/2001 | Wycech |
| 6,332,731 B1 | 12/2001 | Wycech |
| 6,341,467 B1 | 1/2002 | Wycech |
| 6,372,334 B1 | 4/2002 | Wycech |
| 6,406,078 B1 | 6/2002 | Wycech |
| 6,455,126 B1 | 9/2002 | Wycech |
| 6,455,144 B1 | 9/2002 | Wycech |
| 6,482,496 B1 | 11/2002 | Wycech |
| 6,546,693 B2 | 4/2003 | Wycech |
| 6,682,128 B2 | 1/2004 | Carroll, III et al. |
| 6,758,507 B2 | 7/2004 | Tarahomi et al. |
| 6,863,957 B2 | 3/2005 | Wycech |
| 6,865,811 B2 | 3/2005 | Wycech |
| 7,175,230 B2 | 2/2007 | Wycech |
| 7,211,321 B2 | 5/2007 | Wycech |
| 7,261,204 B2 | 8/2007 | Wycech |
| 7,300,616 B2 | 11/2007 | Wycech |
| 2002/0185769 A1* | 12/2002 | Hasegawa et al. ............. 264/51 |
| 2003/0107145 A1* | 6/2003 | Ozasa et al. ............... 264/46.9 |
| 2003/0176128 A1* | 9/2003 | Czaplicki et al. ........... 442/175 |
| 2003/0197400 A1 | 10/2003 | Priesler et al. |
| 2004/0040245 A1* | 3/2004 | Sinclair et al. ................ 52/605 |
| 2004/0178662 A1 | 9/2004 | Carroll, III et al. |
| 2005/0040679 A1 | 2/2005 | Lipke et al. |
| 2005/0161982 A1 | 7/2005 | Cormier et al. |
| 2005/0200062 A1 | 9/2005 | Maurer et al. |
| 2005/0269837 A1 | 12/2005 | Carroll, III et al. |
| 2006/0066134 A2 | 3/2006 | Carroll, III et al. |

* cited by examiner

METHOD FOR FORMING A TANGIBLE ITEM AND A TANGIBLE ITEM WHICH IS MADE BY A METHOD WHICH ALLOWS THE CREATED TANGIBLE ITEM TO EFFICIENTLY ABSORB ENERGY

This application is a continuation of nonprovisional application Ser. No. 11/170,863 filed on Jun. 30, 2005 now abandoned.

BACKGROUND

1. Field of the Invention

The present invention generally relates to a method for forming a tangible item and to a tangible item which is made by a method which allows the created tangible item to efficiently absorb energy and, more particularly, to a new and novel method for increasing the amount of energy which may be absorbed by a tangible item, without appreciably increasing the amount of energy used to normally form the item, and which further allows the produced tangible item to have disparate energy absorption portions in an intentional and programmable manner.

2. Background of the Invention

It is relatively common to see traffic accidents and/or other mishaps which involve a vehicle and/or other type of selectively movable assembly. In these circumstances, a passenger (e.g., an individual residing within the vehicle or within other types of selectively movable assemblies) may be "thrown" within and/or otherwise jostled or moved within the vehicle or other type of selectively movable assembly by the force of the circumstances, in a manner which is dangerous and injurious to the passenger (e.g., the passenger forcibly contacts a portion of the interior of the vehicle or selectively movable assembly and is injured or killed).

It is therefore desirable to construct and/or adapt certain automotive and/or other types of parts and/or components (e.g., respectively forming or representing "tangible items") which readily absorb this impact-type of force and/or energy and "cushion the blow" to the passenger, thereby reducing the likelihood of injury and death. While current tangible items do absorb some energy, they do so in a relatively inefficient manner, are relatively costly to manufacture, and are not "programmable", (i.e., they do not have intentionally disparate energy absorption portions where contact is most likely to occur).

Further, it is desirable to achieve such a capacity without expending substantially more energy than is already being utilized and/or expended to create the part and/or component (e.g., the "tangible item"), and it is frequently and additionally desirable to cause only a portion of a part and/or component to be constructed and/or adapted to efficiently absorb energy (e.g., the portion which is readily contacted by the passenger), thereby reducing the overall cost in producing such an energy absorbing item while concomitantly achieving the desired energy absorption characteristics where they are most likely to be needed.

Further, it is desirable that, if these desirable energy-absorption enhancement characteristics are made within a tangible item, they be made in a manner which substantially utilizes only the type and the amount of energy which is currently used to form the item, thereby further not appreciably increasing the amount of energy already used to produce the item.

There is therefore a need for a new and novel method of forming an automotive part and/or other tangible item which can absorb a relatively high and/or relatively large amount of energy, for a tangible item which has enhanced energy absorption properties, and further for a method which does not substantially increase the amount of energy already expended in forming and/or otherwise creating a part and/or other tangible item but which allows the formed item to have enhanced energy absorption characteristics. There is therefore also a need for a new and improved tangible item having enhanced energy-absorption properties and which may have selectively and intentionally disparate energy-absorbing properties, thereby tailoring and/or "programming" the characteristics of the produced item to the needs of the environment in which it is placed. The present invention provides these and other novel benefits.

SUMMARY OF THE INVENTION

It is a first non-limiting object of the present invention to provide a method for creating a tangible item which overcomes some or all of the previously delineated drawbacks associated with prior and/or current methods or strategies.

It is a second non-limiting object of the present invention to provide a method for creating a tangible item which overcomes some or all of the previously delineated drawbacks associated with prior and/or current methods or strategies and which allows a tangible item to be produced which readily and efficiently absorbs energy in a cost-effective manner.

It is a third non-limiting object of the present invention to provide a method for creating a tangible item which overcomes some or all of the previously delineated drawbacks associated with prior and/or current methods or strategies, which allows a tangible item to be produced which readily and efficiently absorbs energy in a cost-effective manner, and which does not substantially increase the amount of energy required to produce the item without these enhanced energy-absorbing characteristics.

It is a fourth non-limiting object of the present invention to provide a method for creating a tangible item which overcomes some or all of the previously delineated drawbacks associated with prior and/or current methods or strategies, which allows a tangible item to be produced which readily and efficiently absorbs energy in a cost-effective manner, which does not substantially increase the amount of energy required to produce the item without these enhanced energy-absorbing characteristics, and which allows for selectively disparate energy absorption properties to be created within the created tangible item.

According to a first non-limiting aspect of the present invention, a method of forming a tangible item is provided which comprises the steps of forming a pre-part; forming a plurality of adhesive coated beads; and causing said adhesive coated beads to adhere to at least a portion of the pre-part, thereby forming the tangible item.

According to a second non-limiting aspect of the present invention, a method of forming a tangible item is provided which comprises the steps of forming a pre-part which includes at least one pocket; placing adhesive coated beads within the at least one pocket; and compressing the adhesive coated beads, thereby causing said adhesive coated beads to adhere to the pre-part and thereby forming the tangible item.

According to a third non-limiting aspect of the present invention, a method of forming a tangible item is provided which comprises the steps of forming a pre-part which includes at least one pocket; placing adhesive coated beads within the at least one pocket; generating heated air; and directing the heated air to contact the adhesive coated beads, thereby causing the adhesive coated beads to adhere to the pre-part and thereby forming the tangible item.

According to a fourth non-limiting aspect of the present invention, a method of forming a tangible item is provided which comprises the steps of forming a pre-part which includes at least one pocket; placing adhesive coated beads within the at least one pocket; and causing the adhesive coated beads to be placed within a substantially anaerobic environment for a certain amount of time, thereby causing the adhesive coated beads to adhere to the pre-part and thereby forming said tangible item.

According to a fifth non-limiting aspect of the present invention, a method of forming a tangible item is provided which comprises the steps of providing a mold; placing a first material within the mold; placing a second material within the mold, wherein the second material comprises a plurality of adhesive coated beads; and using the mold to create the tangible item comprising a body which is substantially formed from said first material and wherein the body includes an enhanced energy absorption portion which is formed from the plurality of adhesive coated beads which are integrally formed and reside within a certain portion of the body.

According to a sixth non-limiting aspect of the present invention, a method of increasing the amount of energy which may be absorbed by a tangible item is provided wherein the tangible item is normally formed by the use of a process which requires a certain amount of energy, the method comprising the steps of providing beads; placing a certain amount of adhesive material upon the beads, thereby substantially coating the beads with the adhesive material; and causing the coated beads to be adhered to the tangible item only by the use of said certain amount of energy.

According to a seventh non-limiting aspect of the present invention, a method of increasing the amount of energy which may be absorbed by a tangible item is provided which comprises the steps of selecting only a portion of said tangible item; providing adhesive coated beads; and placing the adhesive coated beads only upon said selected portion of said tangible item, thereby programmably providing enhanced energy absorption properties to a selected portion of the produced tangible item.

According to an eighth non-limiting aspect of the present invention, a tangible item is provided which comprises at least one pocket; and a plurality of adhesive coated beads which are resident within said at least one pocket.

These and other objects, aspects and advantages of the present invention will become apparent to one of ordinary skill in the art by reading the following detailed description of the preferred embodiment of the invention and by reference to the following drawings.

DETAILED DESCRIPTION OF THE PREFERRED EMBODIMENT OF THE INVENTION

Referring now to FIGS. 1-8, there is cooperatively shown various new and novel methods and strategies for selectively, cost-effectively, and efficiently creating energy-absorbing tangible items which may even have disparate energy-absorption properties at various locations within the created item, thereby causing the created energy-absorbing tangible items to be highly "programmable" (e.g., having enhanced energy-absorption characteristics only at certain "pre-programmed" locations). It should be appreciated that the present invention is not limited to the production of a certain tangible item, but that various tangible items, of many types, of many shapes, and of many sizes may be selectively created and selectively used within a wide variety of assemblies. Further, it should be realized that various diverse assemblies may utilize these created items and that nothing in this description limits the assembly in which the created "energy absorption-enhanced" item is employed to a vehicle or selectively movable assembly, and that the created tangible items may be formed from plastic, metal, a composite material, or substantially any other desired material and/or blend of materials.

Figure 6:
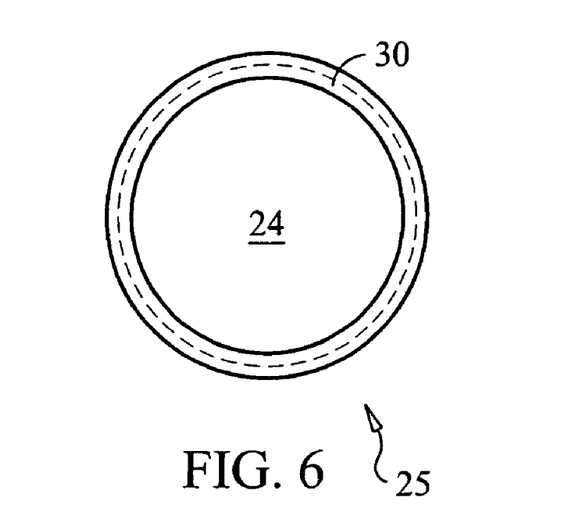
FIG. 6 is a front view of an adhesive-covered bead which is used to create the tangible items according to the various non-limiting methodologies of the present invention.

Particularly, as will be abundantly apparent from the following discussion, the present inventions provide these energy-absorption benefits by the use of a plurality of coated or "adhesive-covered" beads 25 which, as is best shown in FIG. 6, may each comprise a generally circular or spherical body portion 24 which may be evacuated, partially evacuated, or which may be substantially solid, and is substantially covered by a certain adhesive coating material 30. Particularly, the body portion 24 may be comprised of substantially any material which efficiently absorbs a relatively large amount of energy and such material includes, but is not limited to, glass and semi-solid ceramic type material. Some non-limiting examples of such material or beads are those which may be purchased from The Kinetico Corporation of Cayahoga Falls, Ohio and which are commercially referred to by the trademarks Macrolyte® 714, Macrolyte® 1430 or Macrolyte® 357. Other commercially available beads and/or other energy-absorbing material may also be used. Generally, high temperature ceramic beads may be utilized by the various methodologies of the inventions.

The adhesive coating 30 may be comprised of substantially any type of adhesive, including but not limited to a "sticky" adhesive (i.e., a glue-like adhesive or an adhesive activated by room-temperature conditions), a heat-activated adhesive or an anaerobic type adhesive (i.e., adhesives which respectively become active or "sticky" in the presence of heat or in the absence of air and/or oxygen), or a moisture-activated or catalyst-activated type of adhesive. Additionally, the material used for the adhesive coating may be selected from (but is not limited to) several general classes of material such as, by way of example and without limitation, thermoplastic material (hot melt types of material), thermoset material (substantially solid epoxy types of material), thermoset material (liquid resin types of thermoset material and/or water-based liquid types of thermoset material), and/or to various blends of the foregoing.

The process used to create and/or coat the body portion 24 with the selected adhesive material 30 varies depending upon the characteristic of the adhesive 30 which is selected for use and depending upon the pre-part forming process which is utilized as part of the energy enhancement methodologies and/or strategies of the present invention.

For example and without limitation, if a thermoplastic hot melt adhesive and/or a thermoset solid epoxy is used, as the adhesive 30, the beads 24 will be heated beyond the melting point of the adhesive within a heated mixer. The hot melted material is then heated and dispensed at a maximum of about twenty-five percent of the weight of the beads into the heated mixer. The beads are then continuously moved or "tumbled" within the mixer, thereby coating the beads, and the coated beads are then slowly brought to room temperature as they are continuously rotated.

However, if a thermoset liquid resin material and/or a water-based liquid resin material (such as epoxy, polyester, vinyl ester, urethanes, or various blends thereof) is used as the adhesive 30, then the chosen material, such as a flexible, polyester, acrylic or epoxy resin with no more than 1000 centipose viscosity, is catalyzed with a room temperature curing agent, and the catalyzed, flexible resin (or other chosen material) is then poured into the mixer containing the beads at a maximum of about twenty-five percent of the weight of the contained beads. The beads are then continuously tumbled at room temperature. If the thermoset water-based liquid resin is used as the adhesive 30, the additional step of heating the coated and contained beads until the water is driven off the beads and the beads have a drier coat is added to the foregoing process. Once the beads are formed in one of the foregoing manners, they may be selectively dispensed as part of one of the energy enhancement methodologies or strategies of the present invention.

Figure 1:
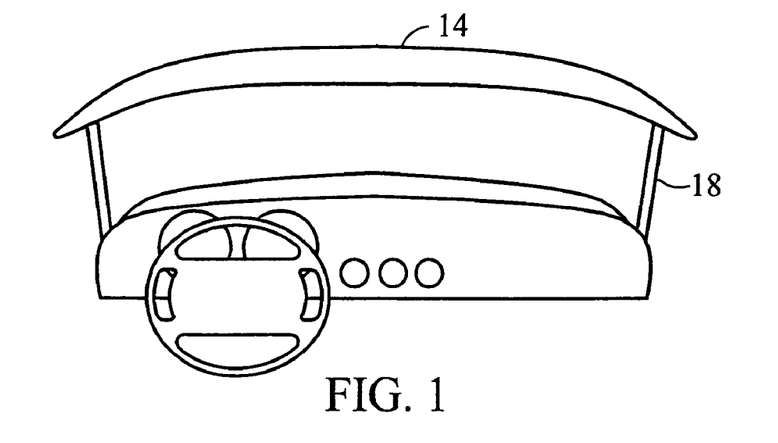
FIG. 1 is an environmental perspective view of a portion of a selectively movable assembly which has been created according to the teachings of preferred embodiment of the present invention and which includes a pair of energy-absorbing tangible items which are made in accordance with the teachings of the preferred embodiment of the present invention.

In one non-limiting embodiment of the invention, it is desirable that a portion of a selectively movable assembly, such as the garnishment and/or trim member 18 of an "A" pillar of a vehicle, or the "headliner" and/or roof portion 14 of a vehicle or other type of selectively movable assembly as best shown in FIG. 1, be able to efficiently and "programmably" absorb a relative high and/or large amount of energy (i.e., more than the energy which is capable of being absorbed by an "unenhanced part" and/or member or item made in a "prior" manner would characteristically and typically have).

It should be understood that the term "pre-part", as used within this description, means a tangible item which is created in a customary or "prior" manner without having the enhanced energy-absorbing characteristics of the present invention.

According to one non-limiting embodiment of the invention, the beads 25 may be placed upon a finished pre-part while it remains within the production assembly (i.e., the tool or apparatus which is used to create the pre-part) or after the finished pre-part has been created and subsequently removed from the production assembly, or during and as a part of the "normal" pre-part production process (e.g., the beads may be "sandwiched" between pre-part layers during the process by which the "finished" pre-part is created), or the beads may be selectively and separately formed into a separate part and/or item and selectively coupled to a part and/or pre-part. It should be realized that the type of adhesive and the method for placing the beads 25 on the tangible item may be chosen so as to not appreciably increase the amount of energy used by the conventional methodology of creating the pre-part, and further that the beads may only be located on a certain preselected portion of the pre-part 22, thereby causing this single portion to have a disparate energy absorption property and/or characteristic from the other portions, thereby "pre-programming" the created tangible item to provide enhanced energy absorption at certain locations.

Figure 2:
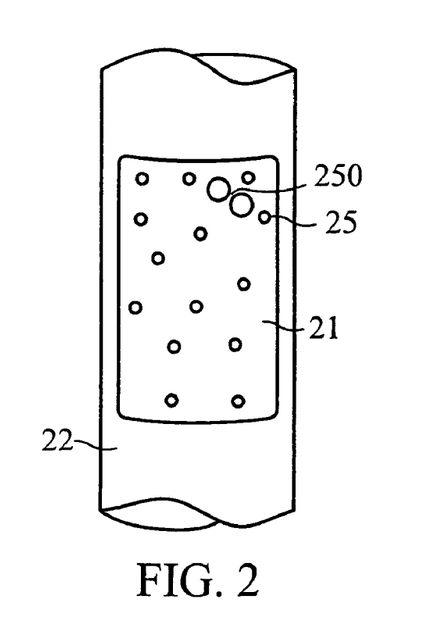
FIG. 2 is a partial back view of one of the tangible items which is made in accordance with the teachings of an alternate embodiment of the present invention and which is shown in FIG. 1.

In one non-limiting embodiment of the invention as best shown in FIG. 2, a pre-part 22 (e.g., an "A" pillar garnishment) is formed within a production assembly (such as assembly 35 shown in FIG. 4) by any desired methodology (e.g., injection molding or male-female compression molding). The beads 25 are dispensed into the production assembly through a desired dispenser 37, after a pocket 21 is formed within at least one surface 11 of the pre-part 22 and the pocket 21 has a size, shape and location which allows the dispensed and subsequently received energy absorption beads to cooperatively provide a desired amount of energy-absorption. It should be realized that the material which is used to form the pre-part 22 is different from the material used to construct the beads 25.

Figure 4:
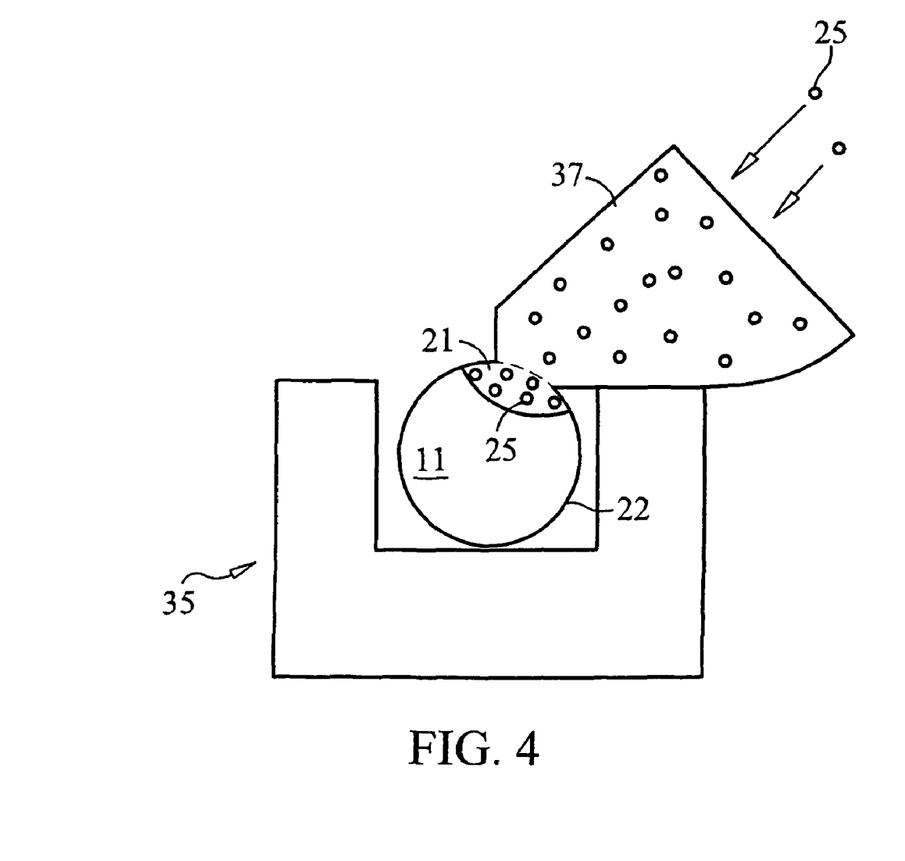
FIG. 4 is a side sectional view of an assembly which is used to form a tangible item in accordance with the teachings of another alternate embodiment of the present invention.

The beads may be additionally and/or selectively shaped and formed with a separate tool (for example, if the pre-part is formed by vacuum forming). The heat and/or other type of energy which is produced by the production assembly 35 is effective, in the most preferred embodiment of the invention, to "cure" (i.e., bond and/or otherwise attach) the adhesive-coated beads 25 to the desired discrete area and/or the entire surface of the finished pre-part (e.g., upon surface 11 and within the pocket 21), thereby creating a tangible item (e.g., an garnishment and/or trim member for an "A" pillar 18), which has the desired and enhanced energy-absorbing characteristics, at least within the formed pocket 21.

By way of example and without limitation, the pocket 21 is formed nearest the head or other member of a driver or passenger of a selectively movable assembly (e.g., when the member 18 is deployed in the selectively movable assembly the pocket 21 is close to the head of a passenger or driver). In this manner, the member 18 has a programmably increased amount of energy absorption only within pocket 21 (which is the most likely portion of the member 18 to be contacted by a passenger), thereby protecting the passenger's head or other member.

Figure 3:
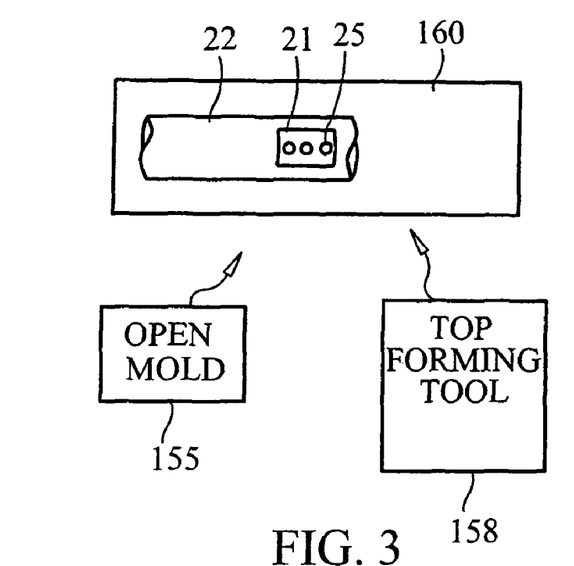
FIG. 3 is a top and partial schematic view of an assembly which is used to apply a plurality of adhesive-coated beads to a finished pre-part which is made in accordance to the teachings of an alternate embodiment of the present invention and which is shown in FIG. 2.

In another non-limiting embodiment of the invention, as best shown in FIG. 3, a substantially finished pre-part 22 may be formed by any substantially desirable process (e.g., injection molding, male-female compression molding, and/or vacuum molding) and removed from the production assembly (such as production assembly 35). In one alternate embodiment of the invention, the conventionally or normally "finished" pre-part is formed by spraying a substance, such as polyurea. The finished pre-part 22 is then placed into a fixture (such as a holding apparatus) or into a tray such as tray 160 which encompasses the entire finished pre-part 22.

A small, open mold 155 and top forming tool 158 are then applied to the "finished" pre-part 22 in a manner which shapes and locates a plurality of the beads 25 over the whole finished pre-part 22 or in a discrete local area on the "finished" pre-part. The "finished" pre-part 22 may then be subjected to conditions such as heat (e.g., from a microwave and/or convection oven), pressure, and/or other conditions (e.g., anaerobic conditions) which activate the adhesive 30 which was selected to coat the beads 25 (including room-temperature conditions), thereby bonding (i.e., curing) the beads 25 to the finished pre-part 22 which has the desired enhanced energy-absorbing characteristics.

Figure 5:
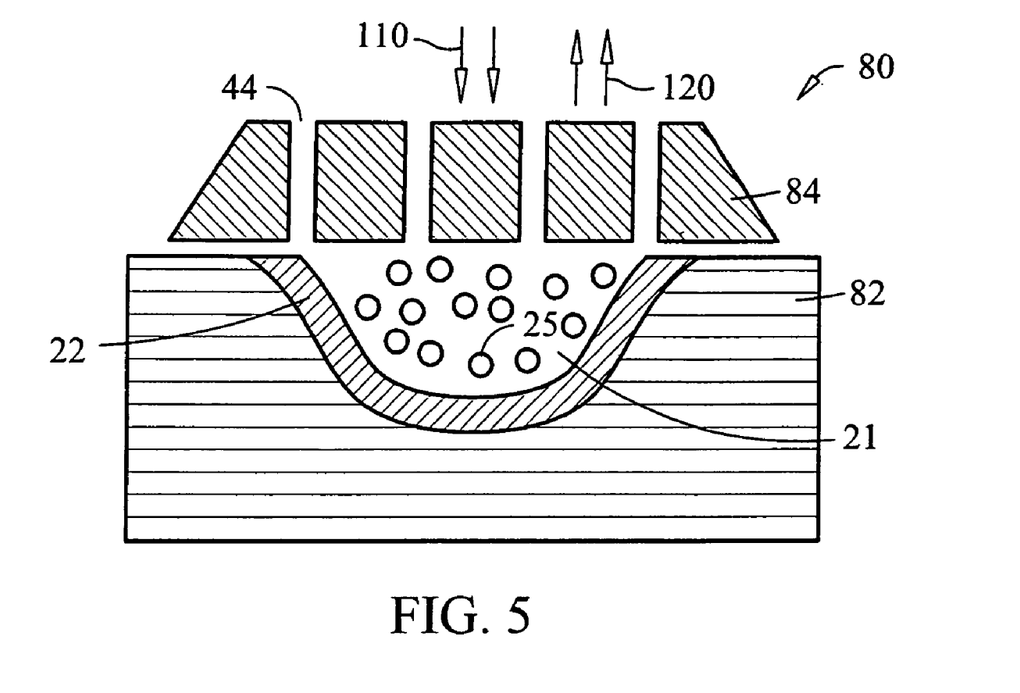
FIG. 5 is a side sectional side view of an assembly which is used to cure a tangible item made in accordance with the teachings of an alternate embodiment of the present invention.

In one non-limiting embodiment, as best shown in FIG. 5, the conventionally or normally "finished" pre-part 22 and the selected beads 25 (which reside within the pocket 21 of the pre-part 22) are placed into a curing apparatus 80 having a first reception or support portion 82 and a second vent portion 84 which has a plurality of vent channels 44. The adhesive on the beads 25 is then activated and/or "cured" (e.g., bonded and/or otherwise attached to the surface of the "finished" pre-part 22) by the addition of hot air in the direction of arrow 110 through the vents 44 or by the evacuation of air in the direction of the arrow 120 through the vents 44 (depending upon the selected adhesive 30 used to coat the beads 25), or by any other desirable chemical process which has the effect of bonding the beads 25 to the finished pre-part 22, thereby creating a part (such as the "A" pillar garnishment 18) which has the desired and enhanced energy-absorption characteristics.

Figure 7:
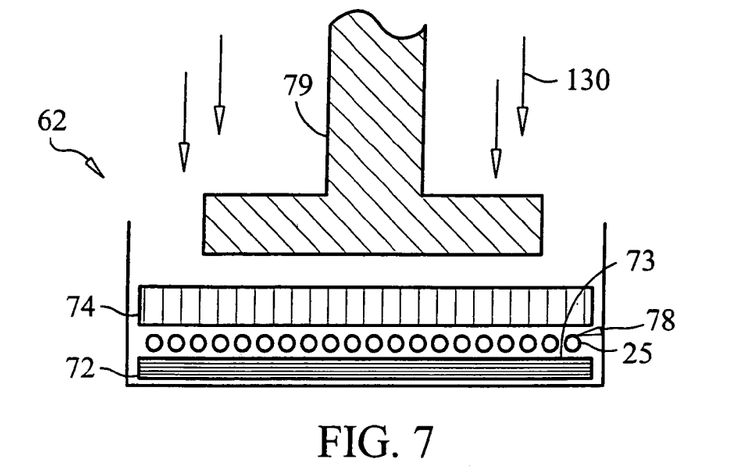
FIG. 7 is a side sectional view of an assembly which is used to form a tangible item in accordance with the teachings of another alternate embodiment of the present invention.
Figure 9:
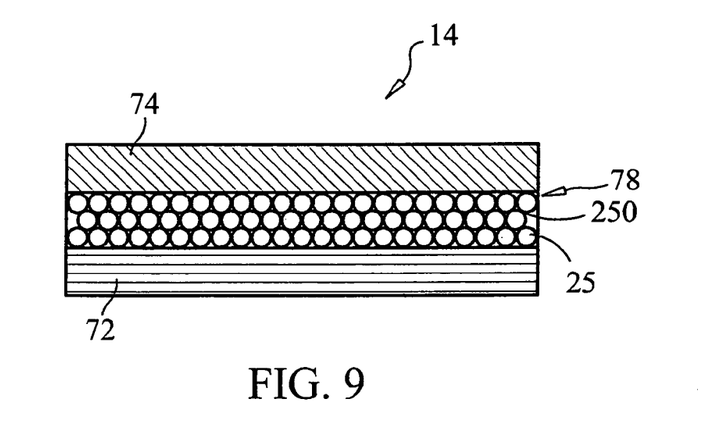
FIG. 9 is a cross-sectional view of a tangible item created according to one of the various methodologies of the present invention.

In another non-limiting embodiment of the invention as shown in FIG. 7, a tangible item such as "headliner" 14 may be formed in a "sandwich-layer" type process from at least two pre-part (or "sandwich substrate") layers 72, 74. In operation, the first "layer" or pre-part 72 is formed and/or molded (e.g., by compression molding,) in a production assembly such as assembly 62. In one non-limiting embodiment of the invention, assembly 62 realizes a molding and/or forming process (e.g., the assembly 62 is a production tool used to conventionally or normally produce a "finished" pre-part) such as by compression member 79, which is coupled to a motor or other driving assembly which propels the compression member 79 in the direction of the arrows 130, effective to mold and/or otherwise form the layers 72, 74. When it is desirable to have an enhanced energy-absorption characteristic within the "sandwich" item (e.g., a "headliner" such as 14), the beads 25 are dispensed and/or deployed onto a prescribed and desired area on the back surface 73 of layer 72 in an intermediate layer 78. A second pre-part or layer 74 is the placed on top of the intermediate layer 78, thereby completing the forming and/or production process, as best shown in FIGS. 7 and 9. Alternately, the "uncured" layers 72, 74 and the intermediate layer 78 may be placed in a male-female type forming tool, heated, and subjected to a final forming process (e.g., vacuum), thereby creating a part and/or tangible item (such as "headliner" 14) which has the desired and enhanced energy-absorption characteristics. It should be realized that material layers 72, 74 may comprise substantially similar or dissimilar materials and that each of the layers 72, 74 has a material which is different from the material used to form the beads 25.

Figure 10:
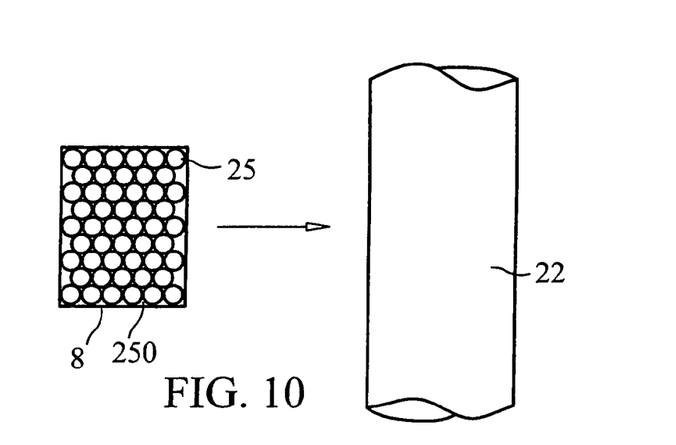
FIG. 10 is a perspective view of an energy-absorbing item which is formed in accordance with the teachings of an alternate embodiment of the invention shown being placed upon a pre-part.

In yet another non-limiting embodiment of the invention as best shown in FIG. 10, the beads 25 are selectively and remotely pre-formed (i.e., molded and/or shaped and cured) into a desired item and/or assembly 8. The item and/or assembly 8 may then be selectively placed onto a "finished" pre-part such as pre-part 22 and selectively glued, coupled, and/or otherwise attached to the pre-part 22.

Figure 8:
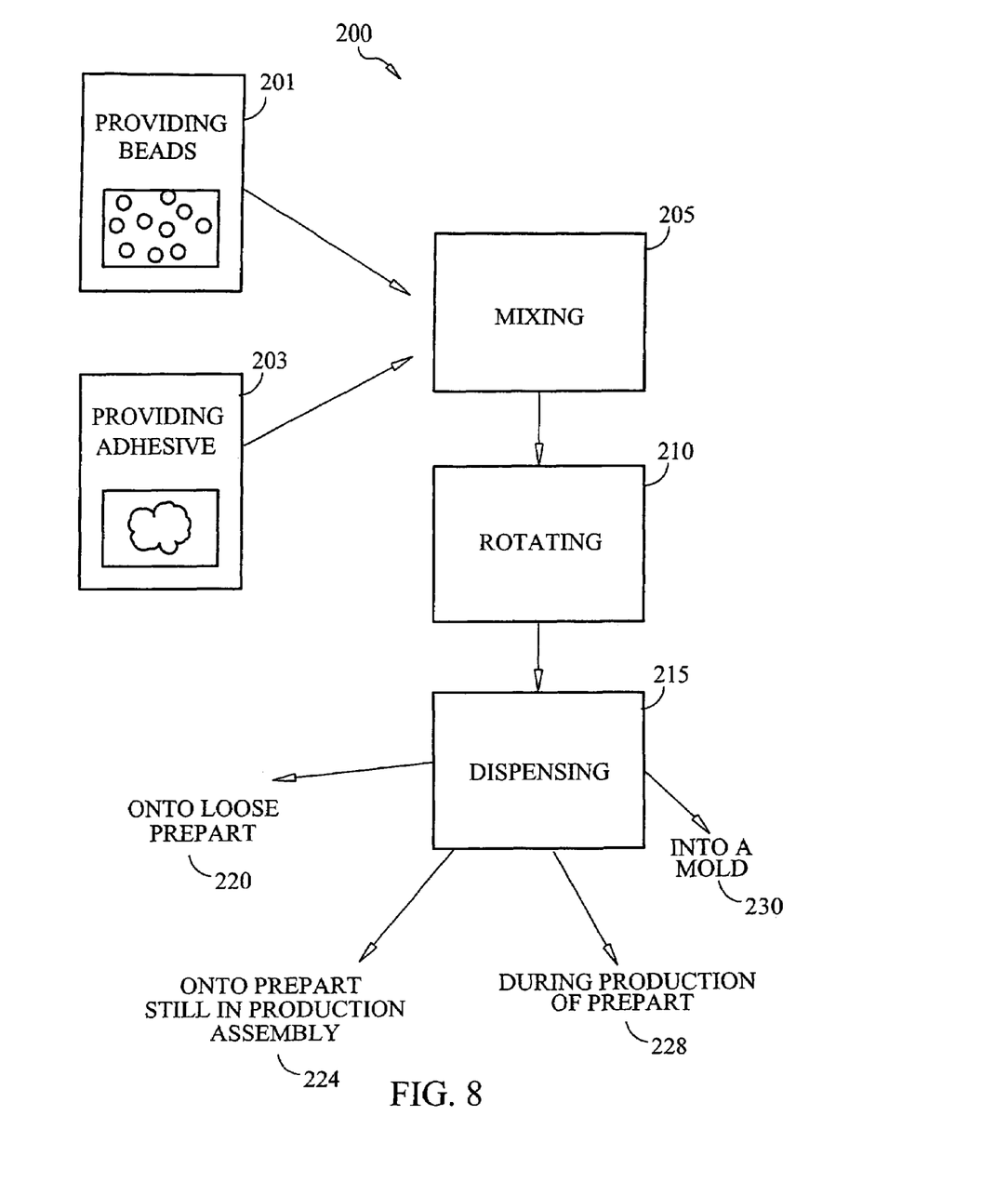
FIG. 8 is a block diagram of a tangible item creation methodology of the various non-limiting methodologies of the present invention.

Referring now to FIG. 8, there is shown a block diagram of the methodology or energy enhancement strategy 200 which may be used, in one non-limiting embodiment of the invention, to create a tangible item (such as "A" pillar garnishment member 18 or "headliner" 14) having a substantially increased capacity for energy absorption. Particularly, the method 200 includes the step 201 of providing a plurality of the beads 24 and the step 203 of providing a plurality of the adhesive coating 30. The beads 24 and the selected adhesive coating 30 are then selectively mixed (step 205) and/or continuously and selectively rotated (step 210) (e.g., within a "cement-mixer" type apparatus) until the adhesive coating 30 substantially covers the surface of each unique one of the plurality of beads 24, thereby creating a desired plurality of adhesive-coated beads 25. The adhesive-coated beads 25 are then selectively dispensed (step 215) by a device (e.g., an auger type pump and or a progressive cavity pump, or an open molding tool such as tool 155 and a top forming tool such as tool 158). It should be realized that the created adhesive-covered beads 25 may be selectively dispensed directly onto a finished pre-part such as finished pre-part 22 either within the production assembly (step 228) or after the finished pre-part 22 has been removed from the production assembly (step 220), during a pre-part creation process (such as the foregoing "sandwich-layer" production process, step 224), or directly into a mold which shapes the beads 25 as desired independent of a part or pre-part (step 230). Each of these processes has been described above.

It should further be appreciated that, when the beads 25 are cured and/or bonded together, a chemical-type bond forms between each molecule of the adhesive 30 and interstices and/or "spaces" 250 between the deployed beads 25 are formed (i.e., the beads cure into a "honeycomb" type arrangement). Since a relatively small amount of energy is required to form these bonds and thereby "cure" the beads 25, this "quick-curing" operation reduces cycle time and reduces costs while increasing overall efficiency. It should further be appreciated that, once cured, the semi-solid ceramic beads are adapted to absorb energy upon being subjected to an impact- or dynamic-type force (i.e., not a static-type force) through several mechanisms including, by way of example and without limitation, the breaking of the chemical bonds which couple and/or attach the beads 25, the crushing and/or other deforming of the semi-solid ceramic beads 25, and the compression of the beads 25 into the interstices 250.

It is to be understood that the invention is not limited to the exact methods which have been illustrated, but that various changes and modifications may be made without departing from the spirit and the scope of the invention as delineated in the following claims. From the foregoing it should be apparent that the adhesive-covered beads 25 may be applied to an automotive and/or other type of part and/or component, such as "A" pillar garnishment and/or member 18, in a manner which increases the capacity of the item to programmably absorb energy and which utilizes the method and/or energy used to form the item to apply the beads 25.

What is claimed is:

1. A method of forming an energy absorbing article comprising the steps of forming a first layer of a prepart; placing said first layer of said prepart within a mold; selecting certain locations of said first layer; placing beads only on said certain locations, such that said beads discontinuously reside on and partially cover said first layer, wherein the beads are coated with an adhesive resulting in adhesive coated beads; casting and curing said adhesive of said adhesive coated beads, effective to cause said adhesive coated beads to be attached to said first layer of said prepart; placing a second layer of said prepart in contact with said adhesive coated beads, wherein said adhesive coated beads reside between said first and said second layer of said prepart; attaching the second layer to said adhesive coated beads; curing said second layer to cause said second layer to adhere to said adhesive coated beads, thereby creating the energy absorbing article having first and second layers having discontinuously residing adhesive coated beads between said first and second layers, wherein each of the adhesive coated beads is adhered to each of said first and second layers.

2. The method of claim 1 wherein said beads each comprise glass beads.

3. The method of claim 1 wherein each of said beads have a spherical body.

4. The method of claim 1 wherein each of said beads is evacuated.

* * * * *